United States Patent [19]
Wakai

[11] Patent Number: 5,501,557
[45] Date of Patent: Mar. 26, 1996

[54] SCREW FASTENER

[75] Inventor: Takao Wakai, Higashiosaka, Japan

[73] Assignee: Wakai & Co., Ltd., Osaka, Japan

[21] Appl. No.: 235,660

[22] Filed: Apr. 29, 1994

[30] Foreign Application Priority Data

Apr. 30, 1993 [JP] Japan ............................. 5-103921
Aug. 17, 1993 [JP] Japan ............................. 5-203294

[51] Int. Cl.⁶ ................................................ F16B 13/06
[52] U.S. Cl. ................................................ 411/55
[58] Field of Search ............................ 411/55–61, 69, 411/908, 44

[56] References Cited

U.S. PATENT DOCUMENTS

| | | | |
|---|---|---|---|
| 2,384,918 | 9/1945 | Houk | 411/55 |
| 2,936,014 | 5/1960 | Kraus | 411/60 |
| 3,279,301 | 10/1966 | Fischer | 411/60 |

FOREIGN PATENT DOCUMENTS

| | | | |
|---|---|---|---|
| 558691 | 5/1923 | France | 411/61 |
| 2436001 | 12/1975 | Germany | 411/60 |
| 2436840 | 2/1976 | Germany | 411/61 |
| 3005214 | 8/1980 | Germany | 411/57 |
| 1458289 | 12/1976 | United Kingdom | 411/60 |

*Primary Examiner*—Flemming Saether
*Attorney, Agent, or Firm*—Wenderoth, Lind & Ponack

[57] ABSTRACT

A screw fastener helps secure a tapping screw easily and strongly to a wall. A starting hole is formed in a wall. The trunk of the screw fastener is inserted into the starting hole. The trunk has such a shape that it comes into contact with the inner surface of the wall defining the starting hole. A tapping screw is driven into the screw fastener thus inserted in the starting hole. The threads on the screw will bite into both the wall and the trunk so that the screw will be rigidly fastened to the wall.

13 Claims, 7 Drawing Sheets

SCREW FASTENER

BACKGROUND OF THE INVENTION

This invention relates to a screw fastener used with a tapping screw for fastening various kinds of members to e.g. a concrete wall to prevent the tapping screw from loosening.

Various fastening means are known for fastening various kinds of members to concrete, ALC (air bubble lightweight concrete), plaster boards or the like. A suitable fastening means is selected according to the material of the member to be fastened. Among such fastening means, tapping screws have advantages in that they are cheap and that two members can be fastened together fairly easily by using them.

One conventional way to fasten a certain member to concrete was to drive tapping screws into starting holes formed in the concrete. Another way was to embed plugs or anchors in the concrete and drive screws into them. In order to fasten a member to ALC, after embedding a plug or an anchor for use with ALC, screws were driven into them. Otherwise, nails for use with ALC such as leg-spreadable nails were driven into ALC.

For plaster boards, too, it was necessary to embed plugs or anchors for use with plaster boards and drive screws into them.

In driving tapping screws directly into concrete, if the starting hole formed in the concrete by drilling has an inner diameter even slightly larger than the diameter of the threads on the tapping screw, the tapping screw may slip and idle when tightened. If too small, it will become very difficult to drive the screw into concrete.

On the other hand, since ALC and plaster boards are brittle, if tapping screws were driven directly into them, they might be chipped off by the screws. If this happens, the screws would slip and loosen.

Figure 6:
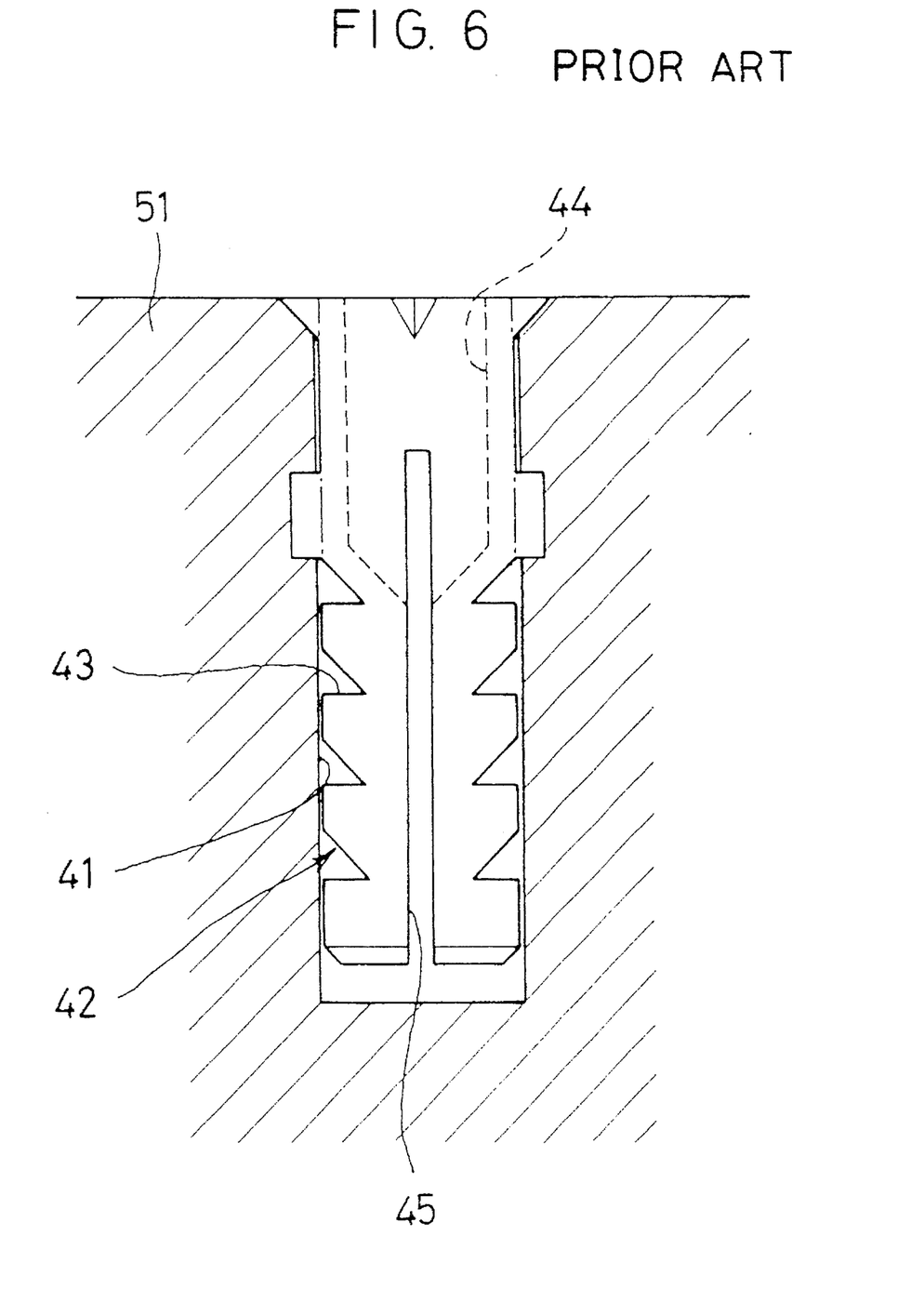
FIG. 6 is a vertical sectional view of a conventional plug for tightening a screw.

When using plugs or anchors, as shown in FIG. 6, a plug 42 or an anchor is inserted in a starting hole 41 formed in a member 51 into which a screw is to be driven. A screw is driven into the plug 42 or anchor and tightened.

The plug 42 has shoulders 43 on the outer periphery thereof to prevent it from coming out of the hole in the member and is formed with an axial bore 44 extending from the top end to an intermediate portion thereof. Further, the plug has slits 45 that extend from the bottom end thereof to its intermediate portion so as to divide the lower part of the plug into a plurality of portions. A tapping screw is inserted into the bore 44 and then driven into the lower part of the plug while radially expanding the plurality of divided portions. The plug is thus tightly pressed against the wall defining the hole. Thus, the plug 42 and the tapping screw fastened to the plug can be held in position so as not to come out of the hole. The anchor is of substantially the same structure as the plug.

With such a conventional method in which plugs 42 or anchors are used, since tapping screws are driven into the plugs 42 or anchors inserted in the starting holes 41 formed in the member 51, the tapping screws never directly come into contact with the member 51. Thus, when the tapping screws are initially driven into the plugs 42 or anchors, the latter are liable to turn together with the screws being driven in. If this happens, the screws cannot be fastened tightly. This tendency is pronounced especially if the member 51 is made of a brittle material.

Furthermore, the use of plugs 42 or anchors will lead to increased cost and longer working time.

SUMMARY OF THE INVENTION

An object of this invention is to provide a screw fastener which makes it possible to firmly tighten a tapping screw in any kind of material.

In order to achieve this object, there is provided a first embodiment of a screw fastener for use in fixing a screw comprising a substantially semi-cylindrical trunk having a semi-circular cross section, and a flange-shaped portion provided at one end of the trunk, the trunk having a wall thickness increasing gradually from the one end toward the other end thereof.

The member to be mounted on a concrete wall is held against the concrete wall. A starting hole is formed in the concrete wall with a drill by inserting a drill through a hole formed in the member. After a screw fastener has been inserted in the starting hole, a tapping screw is inserted through the hole and driven into the starting hole with a screw driver.

The threads on the tapping screw bite into both the trunk of the screw fastener and the concrete wall. As the screw is driven in, the trunk is spread radially and pressed strongly against the inner surface of the starting hole. The screw fastener is thus positively prevented from slipping and idling in the starting hole. The trunk also serves to prevent the formation of gaps between the screw and the surface defining the starting hole, so that the threads can reliably bite into both the concrete wall and the trunk. By using the screw fastener of this invention, a tapping screw can also be tightly fastened to a member such as ALC or a plaster board.

According to the second embodiment, a screw fastener for use in fixing a screw comprises a trunk having a cylindrical cross section and having an eccentric bore, and a head provided at one end of the trunk.

The screw fastener of the second embodiment is also inserted into a starting hole formed in the concrete wall. A tapping screw is driven into the bore with a screw driver or the like. Since the bore is eccentric with respect to the outer periphery of the trunk, the thin-walled portion of the trunk is broken by the threads on the screw, allowing the threads to bite into the concrete wall and form female threads therein. The thick-walled portion of the trunk is pressed hard against the concrete wall as the screw is driven in. The screw thus bites into both the trunk and the concrete wall.

According to both embodiments of the invention, after inserting the screw fastener into a starting hole formed in a concrete wall, a tapping screw is driven in. The male threads on the screw will bite into both the concrete wall and the trunk of the screw fastener with no play formed between the shank of the screw and the surface defining the starting hole. Thus, the member to be mounted can be fixed stably and reliably on the concrete wall. After being driven in, the screw will show high resistance to pulling forces.

In one embodiment, the trunk of the screw fastener has such a shape that it will only contact part of the surface defining the starting hole. In the other embodiment, the trunk has an eccentric bore. In either case, the threads on the screw can bite into both the trunk and the concrete wall. This prevents the screw fastener from turning together with the screw while the screw is being driven in. The screw can be fastened tightly even to a wall made of a brittle material. Moreover, the screw fastener of this invention is considerably less costly to produce than conventional plugs and anchors and can also reduce the installation cost and markedly shorten the installation time.

BRIEF DESCRIPTION OF THE DRAWINGS

Other features and objects of the present invention will become apparent from the following description made with reference to the accompanying drawings, in which.

DESCRIPTION OF THE PREFERRED EMBODIMENTS

A screw fastener 1 of the first embodiment shown in FIGS. 1A–1E has a substantially semi-cylindrical trunk 2 having a semi-circular cross section whose central angle is equal to or less than 180°. A flange-shaped portion 3 is provided at the head of the trunk 2. The wall thickness of the trunk 2 increases gradually from its head toward its leading end.

Figure 1A:
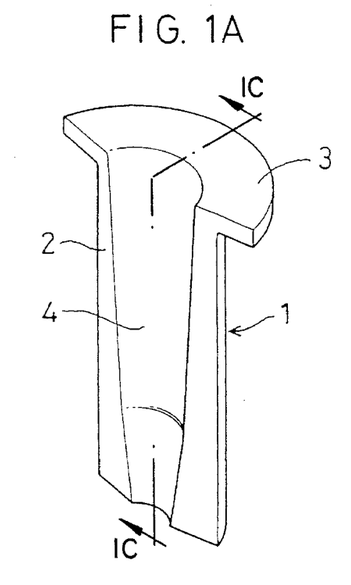
FIG. 1A is a perspective view of the first embodiment of the screw fastener.
Figure 1B:
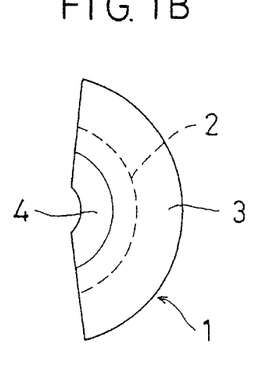
FIG. 1B is a plan view of the same taken along line 7C—7C of FIG. 1A.
Figure 1C:
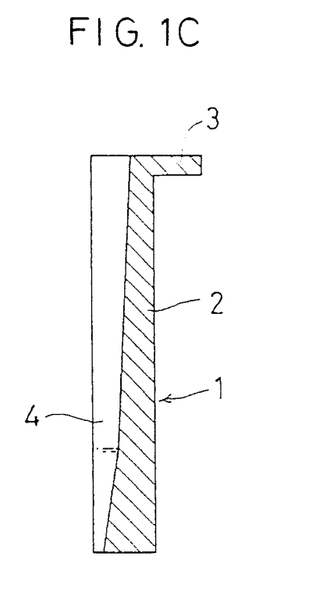
FIG. 1C is a vertical sectional view of the same.

The trunk 2 has a substantially semicircular cross section and is formed with a recess 4 which becomes shallower gradually from its head toward its leading end, so that its wall thickness increases gradually from its head toward leading end.

The outer diameter, inner diameter and length of the trunk 2 may be determined according to the tapping screw used. The screw fastener 1 may be made of any kind of synthetic resin or metal such as lead.

Figure 1D:
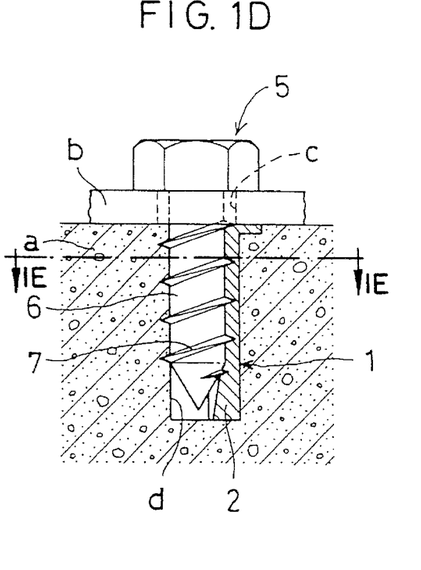
FIG. 1D is a vertical sectional view of the same showing how it is used for tightening a screw.
Figure 1E:
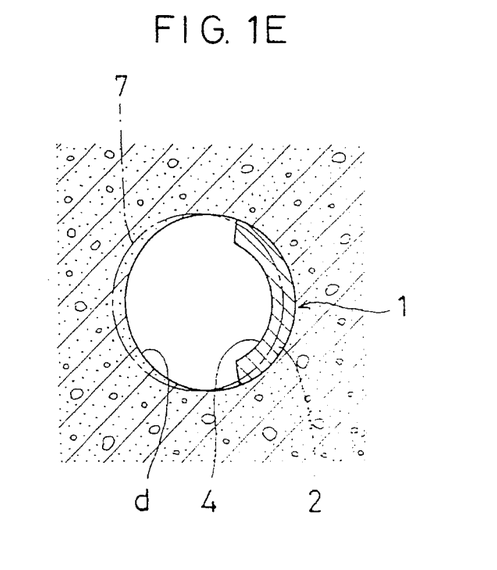
FIG. 1E is a cross-sectional view of the same taken along line 1E—1E of FIG. 1D.

Now we shall describe how the screw fastener of the first embodiment is used. A member b to be fixed on a concrete wall a is put against the wall a. In this state, a starting hole d having a diameter slightly larger than the root diameter of a shank 6 of a tapping screw 5 is drilled in the concrete wall a through a mounting hole c in the member b. The trunk 2 of the screw fastener 1 is inserted in the starting hole d. When inserted, the flange portion 3 provided at the head of the screw fastener 1 abuts the surface of the concrete wall. Thus, it will never drop completely into the starting hole d.

Then, by driving the tapping screw 5 into the starting hole d, male threads 7 formed on the shank 6 of the screw 5 will bite into both the inner periphery of the trunk 2 and that of the concrete wall a defining the starting hole d in the concrete wall a (FIGS. 1D and 1E).

Since the trunk 2 has a semicircular cross section whose center angle is equal to or less than 180 and its wall thickness increases gradually toward its leading end, it is pressed firmly against the surface of the starting hole in the concrete wall as the tapping screw 5 is driven in. Thus, the screw fastener 1 will never turn when the tapping screw is driven in.

The male threads 7 on the tapping screw 5 bite into both the trunk 2 and the concrete wall a so that the portions that have bitten into the trunk 2 are flexibly held by the trunk. The tapping screw 5 is thus prevented from slipping and idling. More specifically, parts of the male threads 7 that have bitten into and have become anchored to the concrete wall a strongly resist pulling forces applied to the screw, whereas the remaining parts of the male threads, which have bitten into the trunk, flexibly withstand long-lasting pulling forces such as vibration. By using the screw fastener of this invention, the tapping screw shows about twice as high resistance to pulling forces as a tapping screw driven in without using the screw fastener, provided the starting holes have the same diameter.

FIGS. 2A–2E show a screw fastener 11 of the second embodiment. It has a trunk 13 having a cylindrical cross section and is formed with an eccentric bore 12. Projections 14 are provided at one end of the trunk 13 with equal intervals therebetween. Since the bore 12 is eccentric, the trunk 13 has a thin-walled portion 15 and a thick-walled portion 16 that are located on opposite sides of the axis of the trunk 13.

Figures 2A, 2B, 2C, 2D, 2E:
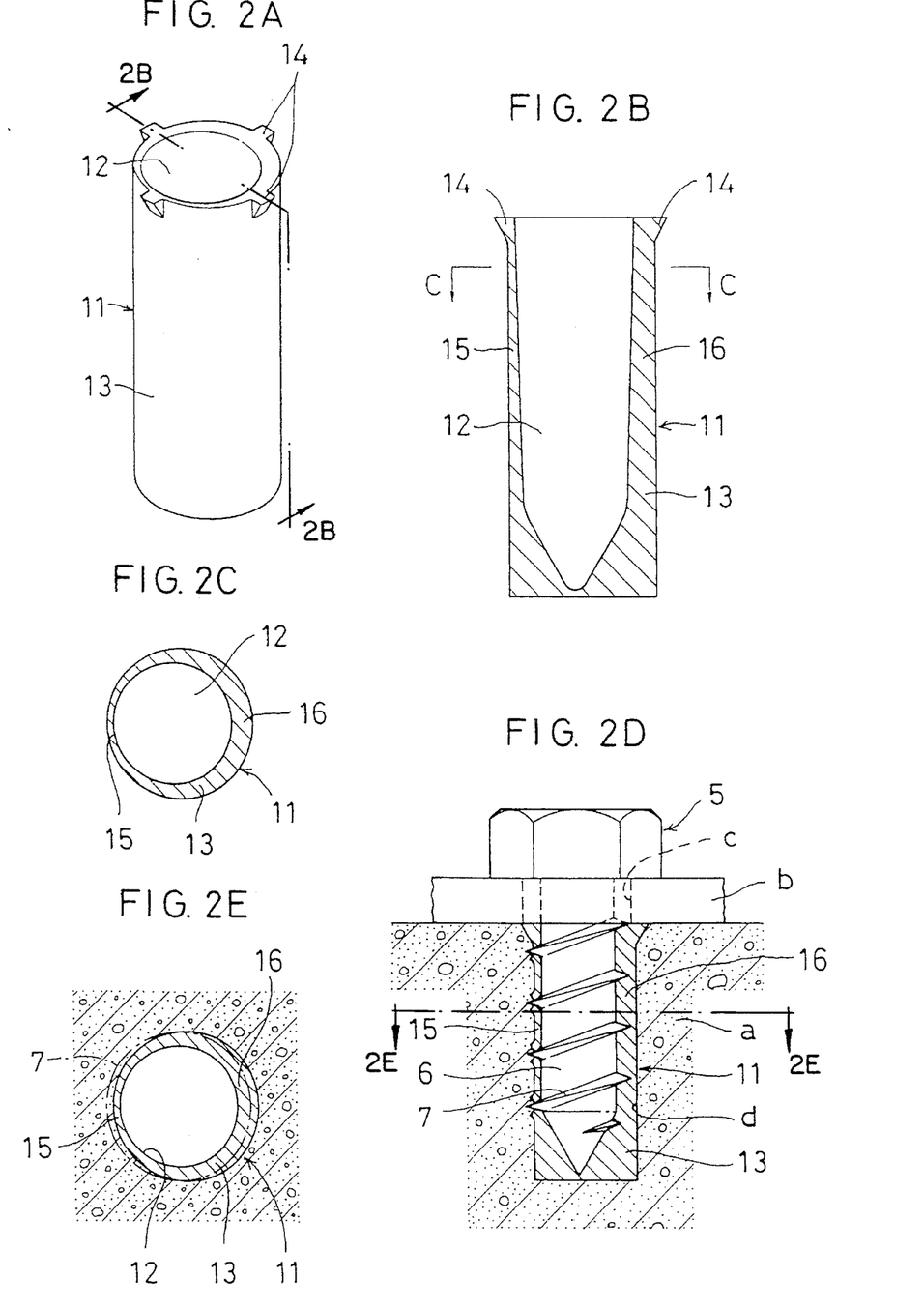
FIG. 2A is a perspective view of the second embodiment of the screw fastener.
FIG. 2B is a vertical sectional view of the same taken along line 2B—2B of FIG. 2A.
FIG. 2C is a cross-sectional view of the same taken along line 2C—2C of FIG. 2B.
FIG. 2D is a vertical sectional view of the same showing how it is used for tightening a screw.
FIG. 2E is a cross-sectional view of the same taken along line 2E—2E of FIG. 2D.

The bore 12 is open at the head of the trunk 13 and closed at the other end. The bore 12 may be straight or tapered (as illustrated) so that its diameter decreases gradually toward the leading end. In this embodiment, both the thickness of the thin-walled portion 15 and that of the thick-walled portion 16 increase gradually toward the leading end.

The outer diameter and length of the trunk 13 and the diameter of the bore 12 may be determined according to the tapping screw 5 used. The screw fastener 11 may be made of synthetic resin or metal such as lead.

We shall now describe how the screw fastener 11 of the second embodiment is used. In the same manner as in the first embodiment, a starting hole d having such a diameter that the trunk 13 snugly fits therein is drilled in the concrete wall a. The screw fastener is inserted in the starting hole d thus formed. Then, the tapping screw 5 is driven into the bore 12 of the trunk 13 with a screw driver.

Figure 7:
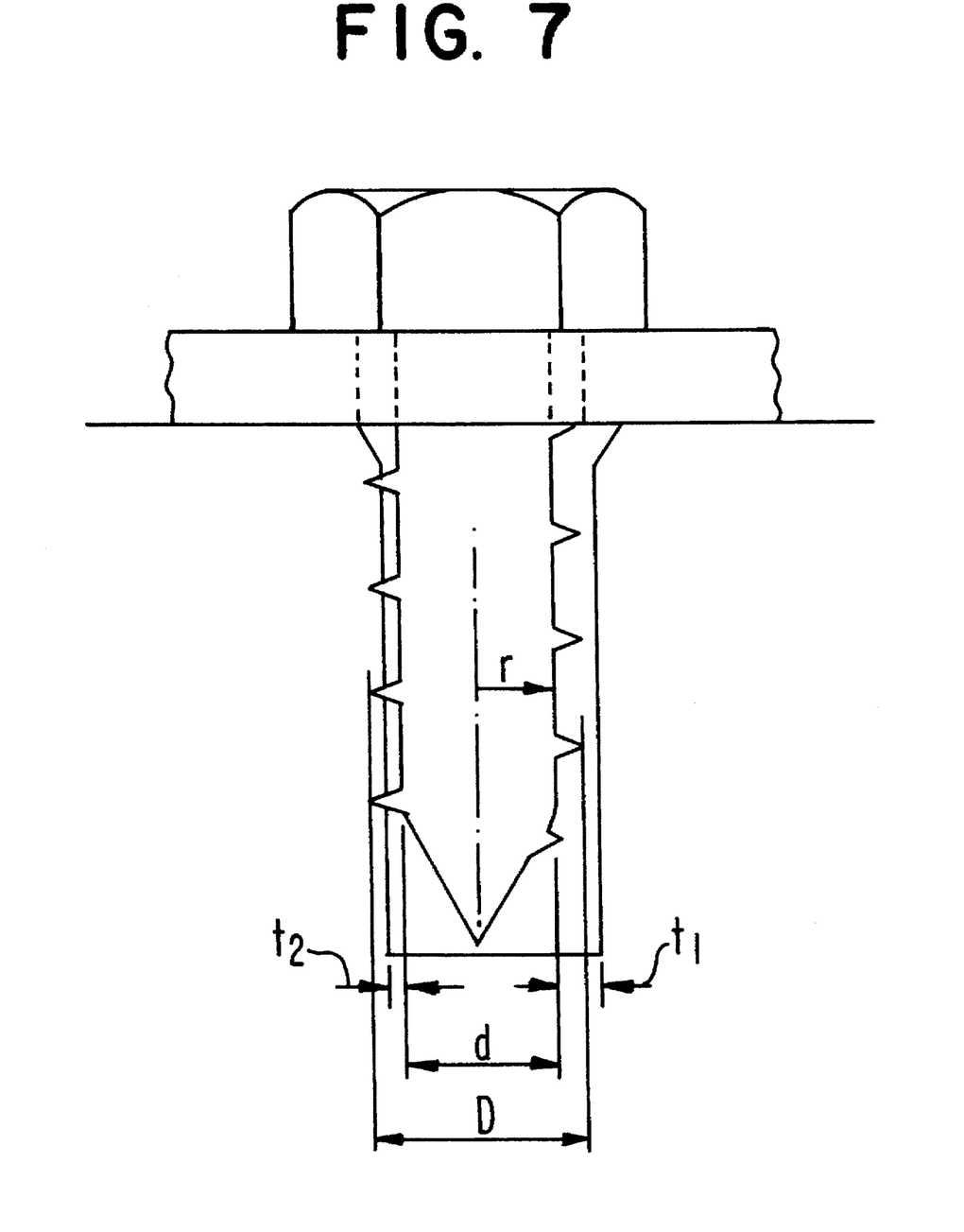
FIG. 7 is a schematic diagram of the fastener assembly for use in illustrating dimensional relationships between the trunk and the screw according to the present invention.

The tapping screw 5 to be used has the following dimensional relationships with respect to the screw fastener (see FIG. 7):

$$d + \tfrac{1}{2}(D-d) > r + t_2,$$

and $$d + \tfrac{1}{2}(D-d) < r + t_1$$

wherein D is the major diameter of the thread of the tapping screw 5, d is the minor diameter of the thread of the tapping screw 5, r is the radius of the bore 12 of the trunk 13 as measured in a cross-sectional plane of the trunk 13 passing through the thin-walled portion 15 and thick-walled portion 16 of the trunk 13, $t_1$ is the thickness of the thick-walled portion 16 of the trunk, and $t_2$ is the thickness of the thin-walled portion 15 of the trunk.

Accordingly, when the shank 6 of the tapping screw 5 is driven in, female threads are formed in the inner surface of the trunk 13 by the male threads 7 on the shank 6, while the thin-walled portion 15 of the trunk 13 is torn apart by the male threads 7, allowing the male threads 7 to bite into the inner surface of the concrete wall a defining the starting hole d in the concrete wall a. Thus, female threads are also formed in the inner surface of the concrete wall.

As the screw 5 is driven in, the thick-walled portion 16 of the trunk 13 is pressed hard against the inner surface of the starting hole d in the concrete wall a. The male threads 7 of the tapping screw 5 thus bite into both the trunk 13 and the concrete wall a. The screw thus fastened shows high resistance to pulling forces as in the first embodiment.

Figure 3A:
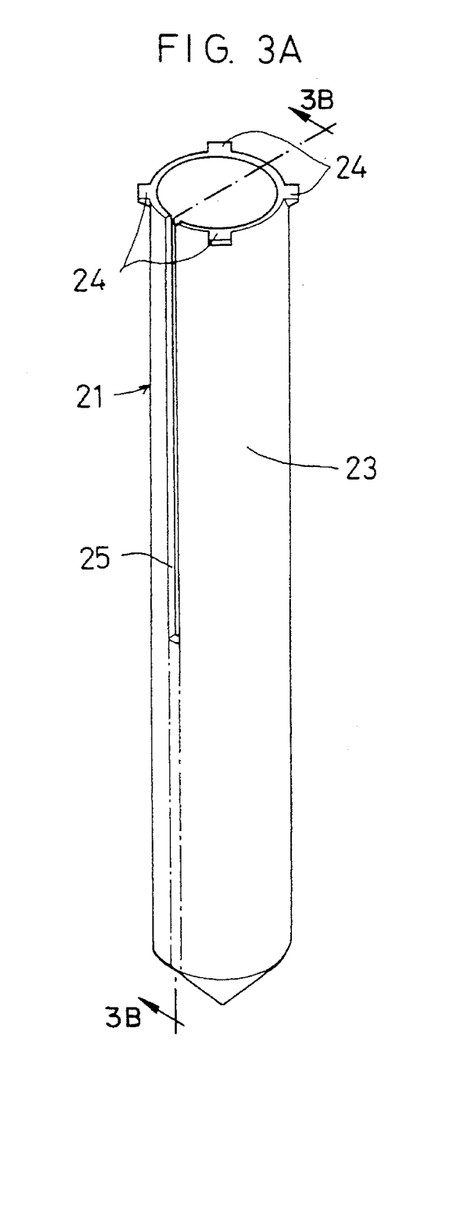
FIG. 3A is a perspective view of the third embodiment.
Figure 3B:
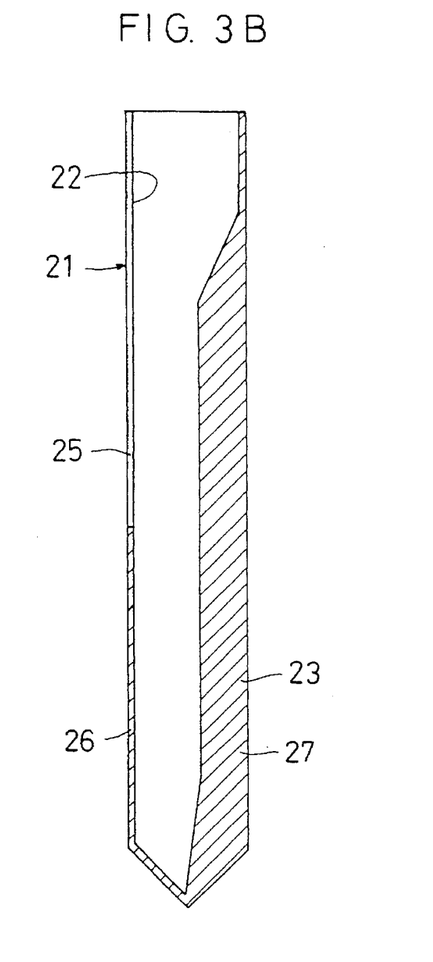
FIG. 3B is a vertical sectional view of the same taken along line 3B—3B of FIG. 3A.
Figure 3C:
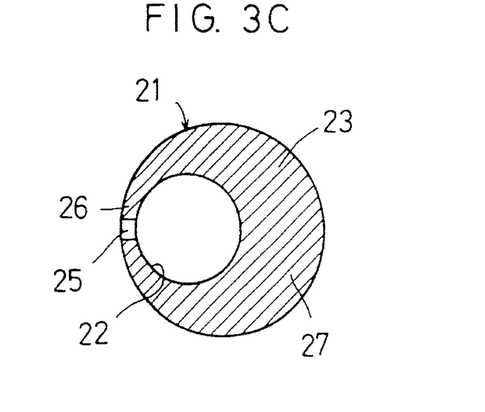
FIG. 3C is a cross-sectional view of the same taken along line 3C—3C of FIG. 3B.
Figure 4A:
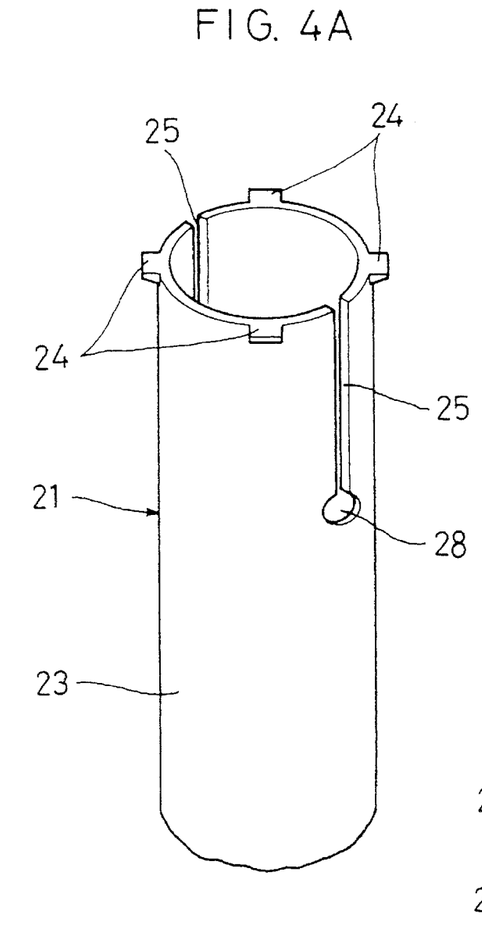
FIG. 4A is a perspective view showing another type of slits formed in the screw fastener.
Figure 4B:
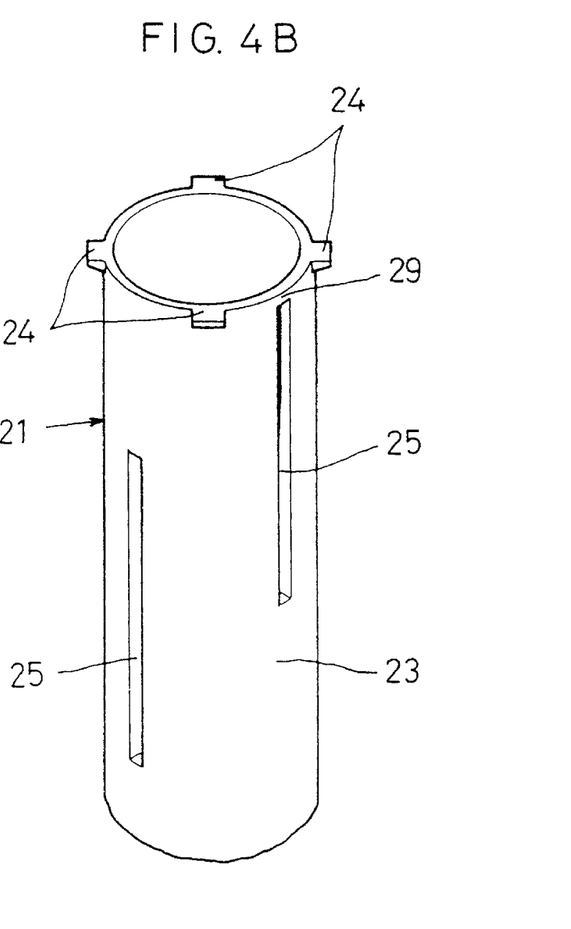
FIG. 4B is a perspective view showing still another type of slits.
Figure 5A:
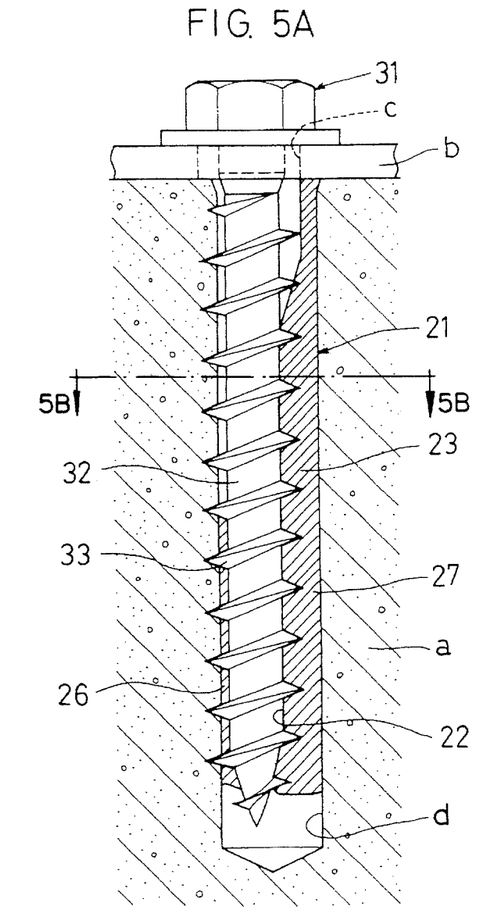
FIG. 5A is a vertical sectional view of the same showing how it is used for tightening a tapping screw.
Figure 5B:
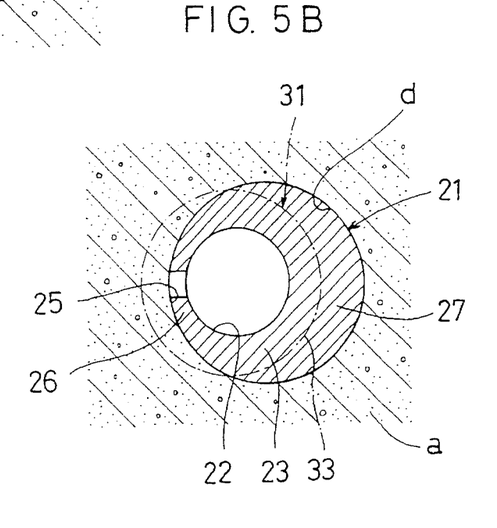
FIG. 5B is a cross-sectional view of the same taken along line 5B—5B of FIG. 5A.

FIGS. 3–5 show the third embodiment of this invention.

As shown in FIGS. 3A–3C, a screw fastener 21 of this embodiment has a trunk 23 made of synthetic resin or lead and having a bore 22. Projections 24 are provided at one end of the trunk 23 so as to protrude outward from its outer periphery. The trunk 23 is further formed with a slit 25 that extends axially from its head portion.

The bore 22 of the trunk 23 is open at the head portion of the trunk. It is coaxial with the trunk at its portion near the opening and is eccentric with respect to the axis of the trunk at its lower portion leading to the tip of the trunk. At the eccentric portion of the bore 22, the trunk 23 is formed with a thin-walled portion 26 and a thick-walled portion 27 on diametrically opposite sides of the axis of the trunk 23.

In the embodiment shown, the bore is open at the head portion of the trunk 23 and is closed at the tip. Alternatively, however, the bore may have both ends open. The eccentric portion of the bore may extend straight or may be tapered so that its diameter decreases gradually toward the tip. In this latter case, the thicknesses of both the thin-walled portion 26 and the thick-walled portion 27 increase gradually toward the tip of the trunk.

The outer diameter and length of the trunk 23 and the inner diameter of the bore 22 may be determined according to a tapping screw 31 used. In the example shown in FIGS. 5A and 5B, the trunk 23 is longer than a shank 32 of the tapping screw 31, while the eccentric portion of the bore 22 has an inner diameter substantially equal to the root diameter of male threads 33 of the screw 31. Also, the thin-walled portion 26 has a thickness slightly smaller than the height of the male threads 33.

The slits 25 formed in the trunk 22 may extend from the head to an intermediate portion of the trunk as shown by a solid line in FIG. 3A or may extend its entire length as shown by a chain line. Also, the number of slits provided and their position are not limited.

Further, as shown in FIG. 4A, the slit that terminates at an intermediate point between the head and the tip of the trunk may be contiguous with a large-diameter hole 28 at its leading end. Otherwise, as shown in FIG. 4B, the slit 25 may be provided in such a way that a tear strip 29 is defined at the top of the slit. Also, another slit 25 may be formed in an intermediate portion of the trunk.

Now we shall describe how the screw fastener of this embodiment is used. The member b to be fixed on a concrete wall a is put against the wall as shown in FIGS. 5A and 5B. In this state, a starting hole d having a diameter slightly larger than the root diameter of the shank 32 of the tapping screw 31 is drilled in the concrete wall a. The trunk 23 of the screw fastener is inserted in the starting hole d.

When inserted, the projections 24 provided on the head portion of the screw fastener 21 abut the surface of the concrete wall. Thus, it will never drop completely into the starting hole d.

Then, by driving the tapping screw 31 into the bore 22 of the screw fastener 21 inserted in the starting hole d, the male threads 33 formed on the shank 32 of the screw 31 will bite into both the inner periphery of the trunk 23 and the inner periphery of the concrete wall a defining the starting hole d formed in the concrete wall a.

The shank 32 of the tapping screw 31 is inserted from its tip into the bore 22 through its opening at the head of the trunk and is driven into the screw fastener 21. Since the trunk has the slit 25, it is quickly and easily expanded radially outwards by the screw and pressed against the surface defining the starting hole d. It is thus fixed in position in the hole d.

Since the trunk is pressed hard against the surface defining the hole d, it is never pushed into the hole d completely. Thus, the tapping screw 31 can be driven into the bore 22 stably.

When the shank 32 of the tapping screw 31 is driven in, female threads are formed in the inner surface of the bore 22 by the male threads 33 on the shank 32, while the thin-walled portion 26 of the trunk 23 is torn apart by the male threads 33, allowing the male threads 33 to bite into the inner surface of the concrete wall a. Thus, female threads are also formed in the inner surface of the concrete wall a.

The thick-walled portion 27 of the trunk 23 is pressed hard against the inner surface of the concrete wall a when the male threads 33 bite into the trunk. Thus, the male threads 33 of the tapping screw 31 bite into both the trunk 23 and the concrete wall a. The portions of the male threads 33 that have bitten into the thick-walled portion 27 are supported flexibly, thus preventing the tapping screw 31 from slipping or idling, whereas the portion of the threads that has bitten into the concrete wall a is anchored thereto, so that they strongly resist pulling forces applied to the screws. On the other hand, the portions of the male threads that have bitten into the trunk 23 flexibly receive and withstand long-lasting pulling forces such as vibration. We found that by using the screw fastener of this embodiment, the tapping screw shows about twice as high resistance to pulling forces as a tapping screw driven in without using the screw fastener, provided the starting holes have the same diameter.

What is claimed is:

1. A fastener assembly comprising: a screw fastener including a trunk having a cylindrical outer surface and a bore extending into said trunk from one end thereof, said bore having an axial center offset in the radial direction of the trunk from the center of the cylindrical outer surface of the trunk such that said bore is eccentric with respect to said outer surface, and such that said trunk has a first portion of a thickness, as measured in the radial direction of the bore that is greater than the thickness of a second portion of the trunk located diametrically across said bore from said first portion, and a head extending radially outwardly of said trunk at said one end thereof; and a screw for insertion into the bore of the trunk of said screw fastener; and the fastener assembly satisfying the following conditions:

$$d + \tfrac{1}{2}(D-d) > r + t_2$$

and $$d + \tfrac{1}{2}(D-d) < r + t_1$$

wherein D is the major diameter of the thread of said screw, d is the minor diameter of the thread of said screw, r is the radius of said bore of the trunk of the screw fastener as measured in a cross-sectional plane of the trunk passing through said first and second portions of the trunk, $t_1$ is said thickness of the first portion of the trunk, and $t_2$ is said thickness of the second portion of the trunk, whereby when said screw fastener is fitted in a starting hole in a wall and said screw is screwed into said screw fastener, a first portion of the thread of said screw penetrates said second portion of the trunk of the screw fastener so as to bite into the wall whereas a second portion of the thread of said screw embeds in said first portion of the trunk of the screw fastener.

2. A fastener assembly as claimed in claim 1, wherein said bore is tapered in a direction extending from said one end of the trunk toward the other end thereof.

3. A screw fastener assembly as claimed in claim 2, wherein said head comprises a plurality of discrete projections.

4. A fastener assembly as claimed in claim 2, wherein said trunk has an inner surface defining said bore, the inner surface having a circular cross section, whereby the inner and outer surfaces of said trunk are eccentric.

5. A fastener assembly as claimed in claim 1, wherein said trunk has an axially extending slit therein.

6. A fastener assembly as claimed in claim 5, wherein said slit extends radially through at least part of said another portion of the trunk.

7. A fastener assembly as claimed in claim 6, wherein said head comprises a plurality of discrete projections.

8. A fastener assembly as claimed in claim 6, wherein said trunk has an inner surface defining said bore, the inner surface having a circular cross section, whereby the inner and outer surfaces of said trunk are eccentric.

9. A screw fastener assembly as claimed in claim 5, wherein said head comprises a plurality of discrete projections.

10. A fastener assembly as claimed in claim 5, wherein said trunk has an inner surface defining said bore, the inner surface having a circular cross section, whereby the inner and outer surfaces of said trunk are eccentric.

11. A fastener assembly as claimed in claim 1, wherein said head comprises a plurality of discrete projections.

12. A fastener assembly as claimed in claim 11, wherein said trunk has an inner surface defining said bore, the inner surface having a circular cross section, whereby the inner and outer surfaces of said trunk are eccentric.

13. A fastener assembly as claimed in claim 1, wherein said trunk has an inner surface defining said bore, the inner surface having a circular cross section, whereby the inner and outer surfaces of said trunk are eccentric.

* * * * *